United States Patent [19]

Schibbye et al.

[11] E Patent Number: Re. 32,055

[45] Reissued Date of Patent: Dec. 24, 1985

[54] METHOD OF OPERATION FOR AN OIL-INJECTED SCREW-COMPRESSOR

[75] Inventors: (Lars) Lauritz B. Schibbye, Saltsjö-Dufnäs; Rolf A. Englund, Spänga, both of Sweden

[73] Assignee: Sullair Technology AB, Stockholm, Sweden

[21] Appl. No.: 694,125

[22] Filed: Jan. 22, 1985

Related U.S. Patent Documents

Reissue of:

[64] Patent No.: 4,462,769
Issued: Jul. 31, 1984
Appl. No.: 326,602
Filed: Dec. 2, 1981

[30] Foreign Application Priority Data

Dec. 12, 1980 [SE] Sweden ..... 8008760

[51] Int. Cl.[4] ..... F04C 18/16; F04C 29/02

[52] U.S. Cl. ..... 418/1; 418/94; 418/98; 418/203

[58] Field of Search ..... 418/1, 94, 98, 203

[56] References Cited

U.S. PATENT DOCUMENTS

| | | | |
|---|---|---|---|
| 1,698,802 | 1/1929 | Montelius | 418/203 |
| 2,082,412 | 6/1937 | Morton | 418/98 |
| 2,111,883 | 3/1938 | Burghauser | 418/203 |
| 3,462,072 | 8/1969 | Schibbye | 418/98 |
| 3,932,073 | 1/1976 | Schibbye et al. | 418/203 |
| 4,180,089 | 12/1979 | Webb | 418/203 |

*Primary Examiner*—John J. Vrablik
*Attorney, Agent, or Firm*—Wood, Dalton, Phillips, Mason & Rowe

[57] ABSTRACT

This invention relates to a method at oil-injected screw-compressors for balancing axial forces at at least one of the rotors of the compressor, for sealing the gaps between rotor housing and rotor shafts and for cooling and lubricating the bearings of the rotor shafts. At the high-pressure end of the compressor oil under pressure of such magnitude is supplied to the bearing spaces (28a,28b) at the ends of both rotors that an oil flow inward to the compression space along the gaps (32a,32b) between the rotor shafts and the rotor housing is obtained for sealing against leakage from the compression space. Oil at this pressure further is supplied via a connection (42) from the bearing space (28b) of the female rotor to a pressure space (38) at the low-pressure end of the female rotor for balancing the axial force arising on the shaft end (31) of the female rotor on the high-pressure side due to the oil supplied to the bearing space (28b) of the female rotor.

9 Claims, 2 Drawing Figures

METHOD OF OPERATION FOR AN OIL-INJECTED SCREW-COMPRESSOR

Matter enclosed in heavy brackets [ ] appears in the original patent but forms no part of this reissue specification; matter printed in italics indicates the additions made by reissue.

This invention relates to a method at oil-injected screw-compressors for balancing axial forces at at least one of the compressor rotors and for sealing the gaps between the rotor shafts and the rotor housing in order to prevent leakage from the compression space of the screw-compressor through these gaps.

It was found very difficult in screw-compressors, at high pressure differences over the compressor to obtain a sufficient service life for the axial bearings, by which the shafts of the rotors are supported.

In order to increase the service life of the axial bearings, it was proposed to use balancing pistons such as shown, for example, in U.S. Pat. No. 3,161,349. This arrangement, however, has proved to involve great disadvantages, including a substantial oil leakage over the outer diameter of the balancing piston. It was, therefore, difficult to maintain the desired balancing pressure, and the leakage has caused losses in the efficiency degree of the compressor. The way in which the balancing piston had been built-in in the compressor, viz. on the rotor shaft located on the high-pressure side closest to the compression space, gives rise to the further disadvantage, that the balancing pressure is transferred along the rotor shaft inward to the rotor body and thereby acts also on the ring area formed by the end surface plane of the rotor body between the shaft diameter and the core diameter of the rotor. The force hereby arising on this ring area acts in a direction opposed to the desired balancing force and, thus, reduces the desired balancing considerably. One object of the invention is to provide a method of axially balancing the rotor shaft, whereby the aforesaid disadvantages of conventional arrangements are eliminated, and which method especially can be applied to screw-compressors operating with high pressure differences, of the magnitude 2 MPa and higher, over the compressor.

A further object of the invention is to provide a method of the aforesaid kind, by which sealing against leakage from the compression space of the compressor along the shafts of the rotors is obtained.

A still further object of the invention is a method of the aforesaid kind to simultaneously effect lubrication and cooling of the bearings provided for the respective shaft.

The improved balancing in combination with the lubrication and cooling possibility have been achieved in that the invention has been given the characterizing features defined in the attached claims.

Figure 1:
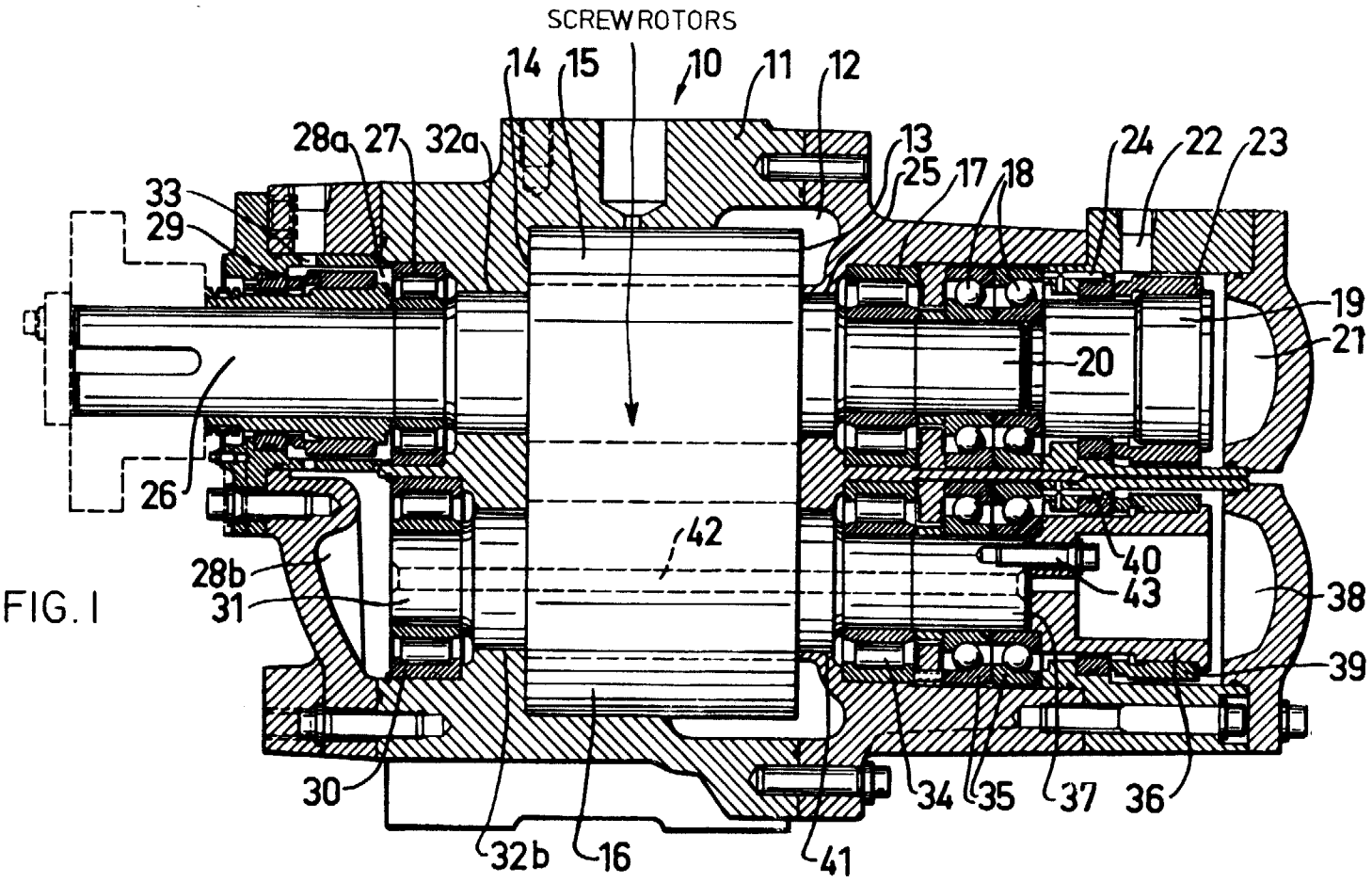
Figure 2:
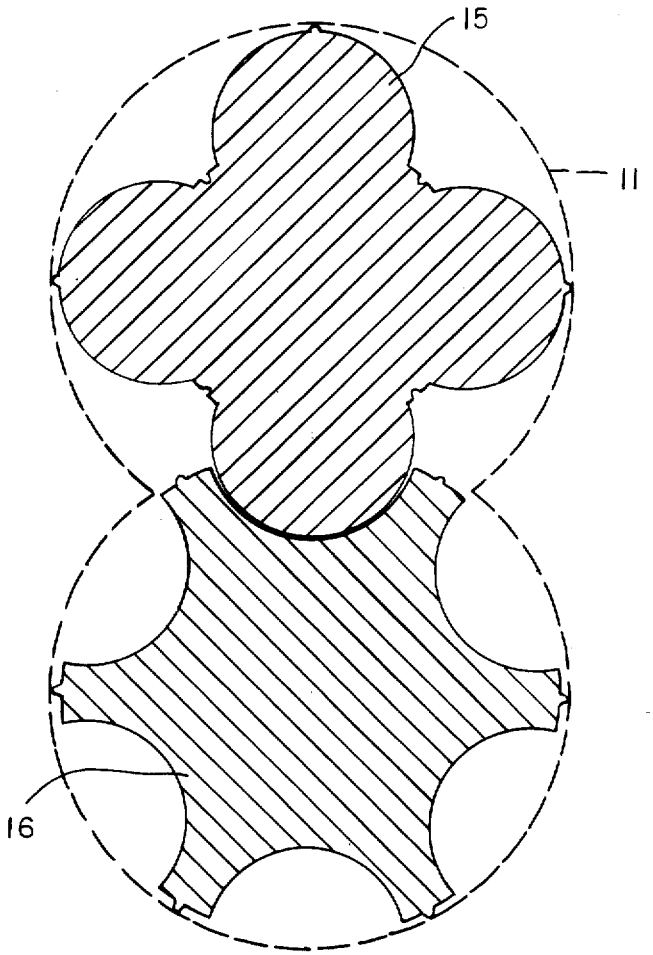

The invention is described in greater detail in the following by way of an embodiment thereof and with reference to the accompanying drawings, of which FIG. 1 is a horizontal section through a screw-compressor provided with an arrangement according to the invention, and FIG. 2 is a cross-sectional view of typical rotors usable with the screw-compressor of FIG. 1.

The rotor housing 11 of the screw-compressor 10 includes a compression space in the form of two rotor barrels forming two intersecting bores, with a low-pressure port 12 at one end 13 and a high-pressure port (not shown) at the other end 14. In the rotor barrels, two meshing rotors, viz. one screw or male rotor 15 and one slide or female rotor 16, are mounted rotatably.

On the low-pressure side of the compressor, a radial bearing 17, preferably of roller bearing type, and an axial bearing 18, preferably of angular contact ball bearing type, are built-in for supporting the male rotor 15. Outside said bearing package a balancing piston 19 is located at the rotor shaft end 20 for balancing the main part of the axial forces acting on the high-pressure end of the male rotor 15. Said balancing piston 19 is located in a pressure space 21, to which oil under pressure can be supplied from the outside through an oil inlet opening 22. The oil under pressure can be supplied by any suitable means, such as by an external oil pump or from the oil separator conventionally used in the discharge pipe system of an oil injected screw compressor. At the outer diameter of the balancing piston a mechanical seal 23 is located which ensures that a constant pressure of the oil supplied is maintained. In order to effect oil circulation for cooling this sealing 23 and for cooling and lubricating the bearing package 17,18, connections 24 are drilled from the pressure space 21 outside the balancing piston 19 into the bearing space at the rotor shaft. The oil can continue to pass from here along gaps 25 between the rotor shaft and the rotor housing into the compression space for sealing these gaps 25, thereby eliminating leakage from the compression space.

The screw-compressor 10 is driven via the drive shaft 26 of the male rotor 15 which extends outward through the rotor housing 11 on the high-pressure side of said housing and is supported in a radial bearing 27 located in a bearing space 28a. In this bearing space also a mechanical shaft seal 29 of the drive shaft 26 is provided. The bearing space 28a on the high-pressure side of the male rotor 15 is in direct connection with a bearing space 28b on the high-pressure side of the female rotor 16. In the bearing space 28b of the female rotor a radial bearing 30 is located for supporting the shaft 31 of the female rotor on the high-pressure side. As can be seen, no special seals against the compression space are built-in. Oil is supplied under pressure to the bearing spaces 28a,28b through a throttling 33, which is adjusted so as to deliver a pressure of the magnitude of the arithmetic mean value of the inlet and outlet pressure of the screw-compressor. This oil pressure can also be supplied by any suitable means, such as by an external oil pump or an oil separator as previously mentioned. Since it has been found that the pressure around the shafts inside the compression space is at the mean value of the inlet and outlet pressures, an oil flow is ensured through the bearings 27,30 along the gaps 32a,32b formed between the rotor shafts 26,31 and the rotor housing into the compression space, whereby cooling and lubrication of these bearings 27,30 are obtained and at the same time gas leakage out of the compression space along the rotor shafts 26,31 is prevented.

For supporting the female rotor 16 on the low-pressure side, a bearing package like the one for the male rotor 15 is built-in in the form of a radial bearing 34, preferably of roller bearing type, and an axial bearing 35, preferably of angular contact ball bearing type. Outside this bearing package, a balancing piston 36 is attached by screws (one screw 43 indicated in the Figure)to the shaft end 37 of the female rotor. (A corresponding attachment applies to the balancing piston 19 at the shaft end of the male rotor). The balancing piston 36 is located in a pressure space 38, to which oil under pressure is supplied. At the outer diameter of the balancing piston 36 a mechanical seal 39 is provided to ensure that a constant pressure of the oil supplied is maintained. In order to effect oil circulation for cooling this sealing 39 as well as for cooling and lubricating the bearing package 34,35, connections 40 are drilled from the pressure space 38 into the bearing space at the shaft end 37 of the slide rotor. The oil can continue to pass from here along gaps 41 between the rotor shaft and rotor housing into the compression space for sealing these gaps 41 against leakage from the compression space.

For supplying oil to the pressure space 38 on the low-pressure side of the female rotor 16, a connection 42 is drilled axially along the central line of the female rotor, so that in the bearing space 28b of the female rotor and the pressure space 38 a common pressure is obtained.

The pressure space 21 for the balancing piston 19 of the male rotor 15 is supplied with oil, the pressure of which corresponds to the outlet pressure of the screw-compressor reduced by the pressure drop in the oil cooler and oil filter. The oil pressure in this pressure space 21, thus, is substantially higher than in the corresponding pressure space 38 on the female rotor side. This higher pressure is desirable in view of the substantially higher axial forces acting on the male rotor 15 compared with those acting on the female rotor 16, the higher axial forces resulting from the larger area on the male rotor 15 then on the female rotor 16 on which the outlet gas forces act.

Due to the fact that the screw-compressor is driven from the high-pressure side of the male rotor, no free shaft journal area does exist here and, thus, no additional axial forces from the bearing space 28a on the high-pressure side are obtained. It was hereby possible to limit the area on the balancing piston of the male rotor and to design it with the same size as on the female rotor side. It was hereby possible that both the bearing package and the balancing piston system inclusive of the mechanical seals at the low-pressure ends on the male and female rotor sides could be designed identical.

As regards the dimensioning of the connections 24 and 40 drilled from the pressure spaces 21 and, respectively, 38, the hole area obtained by one or more bores is calculated on the basis of available oil pressure difference and oil viscosity, so that a suitable oil amount for cooling and lubricating the bearing package is obtained. This oil amount normally is of the magnitude 5 liters/-min per bearing package.

As regards the throttling 33, this is to be calculated so that the oil supply therethrough slightly exceeds the oil amount calculated for the flow in the aforesaid connections. Hereby an oil supply along the gaps 32a, 32b on the high-pressure side into the compression space always is obtained. It is, however, an essential and characterizing feature of the invention, that a more accurate dimensioning of this throttling is not required, because an oil supply in excess of the aforesaid minimum amount implies only that the pressure in the bearing spaces 28a,28b and in the pressure space 38 of the female rotor increases relatively insignificantly, because due to the higher pressure the oil flow along the gaps 32a,32b on the high-pressure side increases simultaneously.

A further essential and characterizing advantage of the invention is that, if the pressure according to the aforesaid increases in the bearing spaces 28a,28b, this does not effect the axial forces neither of the male rotor nor of the female rotor, because the ingoing shaft 26 is the drive shaft, and the sealing area of the mechanical seal 29 is located on the same level as the diameter of the rotor shaft extending into the compression space and, therefore, the pressure in the bearing space 28a does not yield any axial force, but the axial forces on the rotor shaft 26 substantially completely balance each other in this space 28a. What has been stated above for the male rotor 15, applies in principle also to the female rotor 16, viz. that the axial forces substantially are independent of the pressure in the bearing space 28b, because the axial force obtained on the rotor shaft 31 in this space 28b is balanced substantially completely by the axial force obtained on the balancing piston 36 on the opposite side of the female rotor, due to the fact that, as described above, the same pressure prevails on both sides, and that the pressure area on both sides substantially is of the same size, because the diameter of the rotor shaft 31 on the high-pressure side is substantially the same as the diameter of the balancing piston 36 on the low-pressure side.

The arrangement described above has brought about in an operationally very reliable way an oil circulation system for the cooling and lubrication of bearings and mechanical seals and an axial balancing system for both rotors, thereby rendering it possible to use simple and inexpensive bearings with a good service life. On the male rotor where the axial forces are high, the arrangement via the balancing piston yields a balancing force, which increases with increasing counterpressure in the compressor (the counterpressure being dependent on the outlet pressure, which corresponds to the pressure in space 21), the bearing forces and, thus, the bearing service life substantially are constant. A change of the inlet pressure to the compressor does not affect the axial forces acting on the male rotor from the balancing piston or bearing space. As regards the female rotor, the axial forces from the balancing piston and bearing space are not affected, either, by changes in the inlet or outlet pressures of the compressor.

What we claim is:

1. A method at an oil-injected screw-compressor for balancing axial forces at at least one of the rotors of the compressor, for sealing the gaps between the rotor housing and the shafts of the rotors and for cooling and lubricating the bearings of the rotor shafts, where a rotor housing includes a compression space in the form of two rotor barrels defined by two intersecting bores with a low-pressure port at one end and a high-pressure port at the other end, and two meshing rotors, viz. a male rotor and a female rotor, mounted rotatably in the rotor barrels, which compressor is driven on the shaft of the male rotor on the high-pressure side, characterized in that at the high-pressure end of the compressor oil under pressure is supplied to bearing spaces at the ends of both rotors, that an oil flow inward to the compression space along the gaps between the rotor shafts and the rotor housing is obtained for sealing against leakage from the compression space, and that oil is supplied via a connection from the bearing space of the female rotor to a pressure space at the low-pressure end of the female rotor for balancing the axial force arising on the shaft end of the female rotor on the high-pressure side due to the oil supplied to the bearing space of the female rotor.

2. A method as defined in claim 1, characterized in that the oil is supplied to the bearing spaces through a common inlet conduit, and that the two bearing spaces are in direct connection with each other.

3. A method as defined in claim 1, characterized in that the supply of oil from the bearing space of the female rotor to the pressure space is effected via a bore extending centrally through the slide rotor shaft.

4. A method as defined in claim 1, characterized in that roller bearings provided for supporting the rotor shafts in the bearing spaces are cooled and lubricated by the oil supplied to the bearing spaces.

5. A method as defined in claim 1, characterized in that for preventing axial forces from being supplied to the shaft of the male rotor due to the oil supplied to the bearing space of the male rotor, the oil acts on a mechanical seal located about the drive shaft in such a manner that the sealed surface has about the same diameter as the diameter of the rotor shaft where the shaft passes through the rotor housing.

6. A method as defined in claim 1, characterized in that for axial balancing the male rotor, oil under pressure is supplied to a pressure space adjacent to the shaft end of the male rotor on the low-pressure side.

7. A method as defined in claim 6, characterized in that for balancing the shaft ends of the male rotor and, respectively, female rotor, balancing pistons located in the pressure spaces are pressed against the shaft ends, and that the outer diameters of the balancing pistons are sealed by mechanical seals so that the oil pressures supplied to the pressure spaces are maintained.

8. A method as defined in claim 7, characterized in that for supporting the rotor shafts on the low-pressure side, the shaft ends of the male and female rotors are supported in roller bearings and angular contact ball bearings.

9. A method as defined in claim 8, characterized in that from the pressure spaces oil is supplied via connections equipped with throttlings to the bearings for lubricating and cooling the same.

* * * * *